(12) United States Patent
Tan et al.

(10) Patent No.: US 6,733,737 B1
(45) Date of Patent: May 11, 2004

(54) RAPID OXIDATION/STABILIZATION TECHNIQUE FOR CARBON FOAMS, CARBON FIBERS AND C/C COMPOSITES

(75) Inventors: Seng Tan, Beavercreek, OH (US); Cher-Dip Tan, Clifton Park, NY (US)

(73) Assignee: Wright Materials Research Corp., Beavercreek, OH (US)

( * ) Notice: Subject to any disclaimer, the term of this patent is extended or adjusted under 35 U.S.C. 154(b) by 115 days.

(21) Appl. No.: 09/941,343

(22) Filed: Aug. 29, 2001

(51) Int. Cl.⁷ .................................................. D01F 9/12
(52) U.S. Cl. ................................ 423/447.5; 423/447.4; 208/44; 264/29.1
(58) Field of Search ........................... 423/447.4, 447.5; 208/44; 264/29.1

(56) References Cited

U.S. PATENT DOCUMENTS

| | | | | |
|---|---|---|---|---|
| 3,385,915 A | * | 5/1968 | Hamling | 264/5 |
| 4,362,646 A | * | 12/1982 | Ikegami et al. | 502/185 |
| 4,840,762 A | * | 6/1989 | Sawaki et al. | 264/29.2 |
| 4,970,189 A | * | 11/1990 | Tachibana | 502/183 |

* cited by examiner

*Primary Examiner*—Stuart L. Hendrickson
*Assistant Examiner*—Peter J Lish

(57) ABSTRACT

An enhanced method for the post processing, i.e. oxidation or stabilization, of carbon materials including, but not limited to, carbon foams, carbon fibers, dense carbon-carbon composites, carbon/ceramic and carbon/metal composites, which method requires relatively very short and more effective such processing steps. The introduction of an "oxygen spill over catalyst" into the carbon precursor by blending with the carbon starting material or exposure of the carbon precursor to such a material supplies required oxygen at the atomic level and permits oxidation/stabilization of carbon materials in a fraction of the time and with a fraction of the energy normally required to accomplish such carbon processing steps. Carbon based foams, solids, composites and fiber products made utilizing this method are also described.

6 Claims, 14 Drawing Sheets

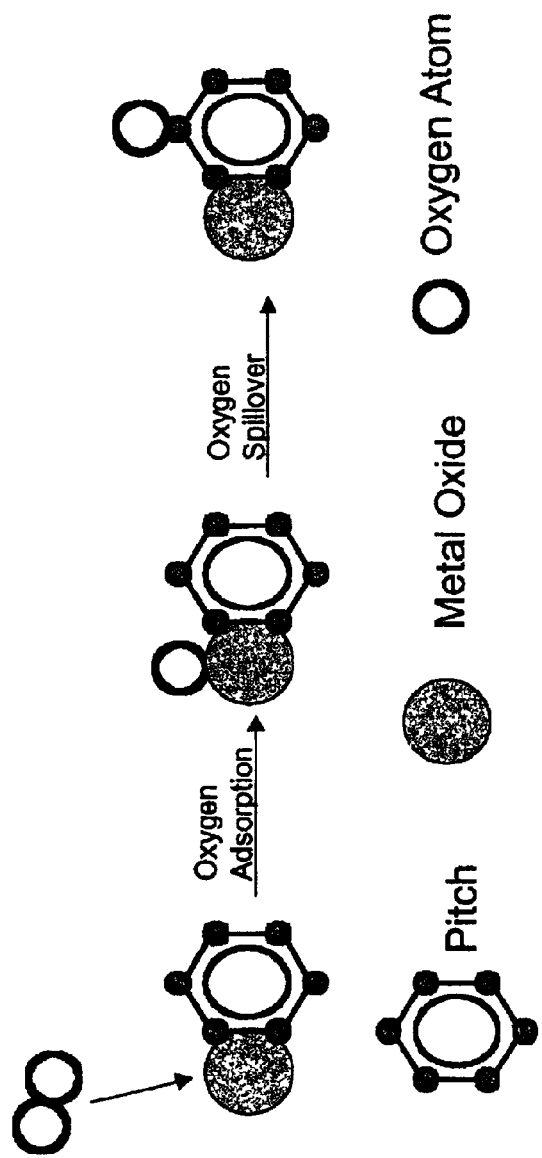
Figure 1. Schematic representation of a novel approach to promote oxidative stabilization process where PITCH stands for pitch/PAN/rayon carbon precursor.

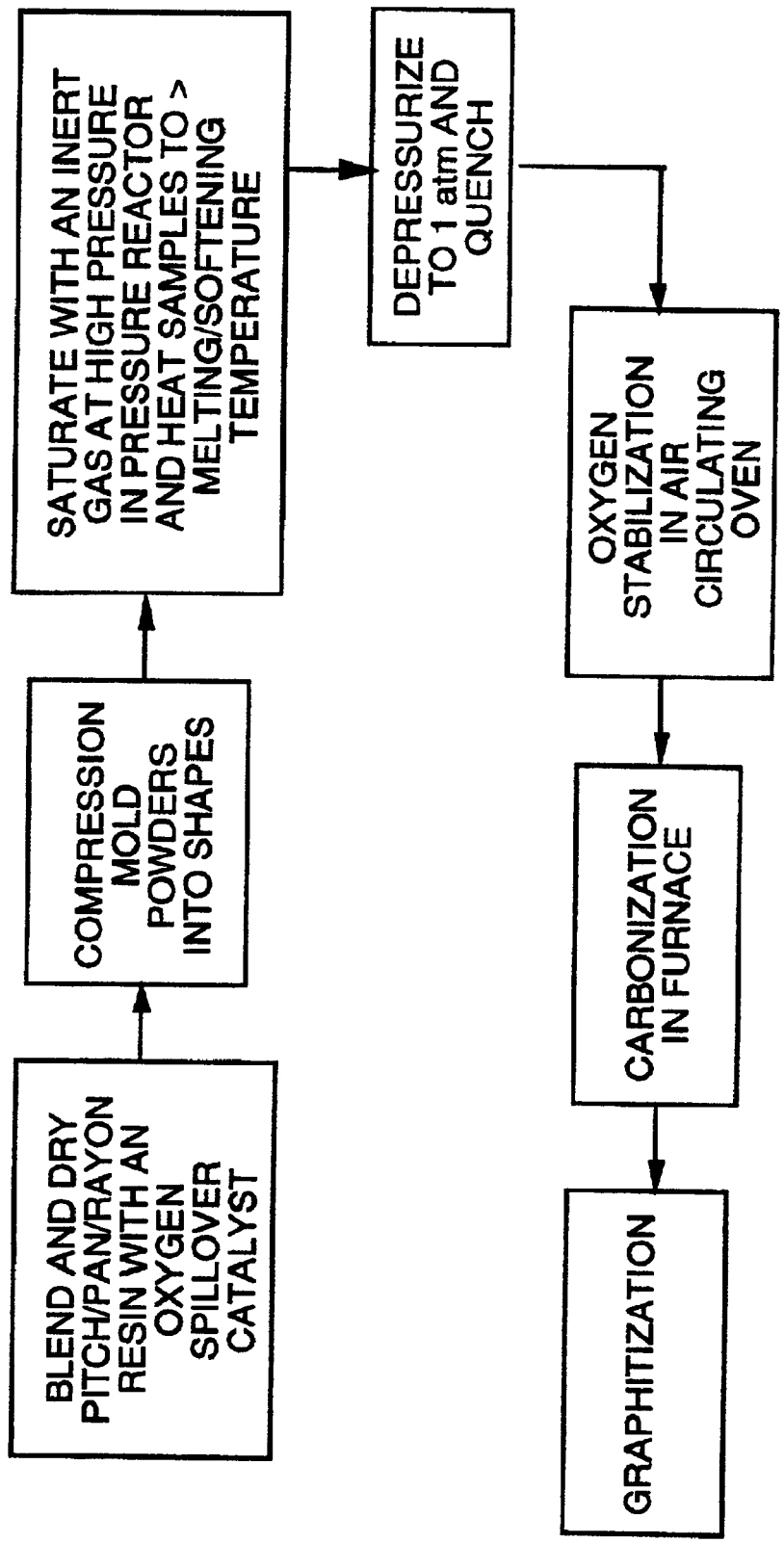
Figure 2. Sequence for the processing of microcellular carbon foam blended with an oxygen spillover catalyst.

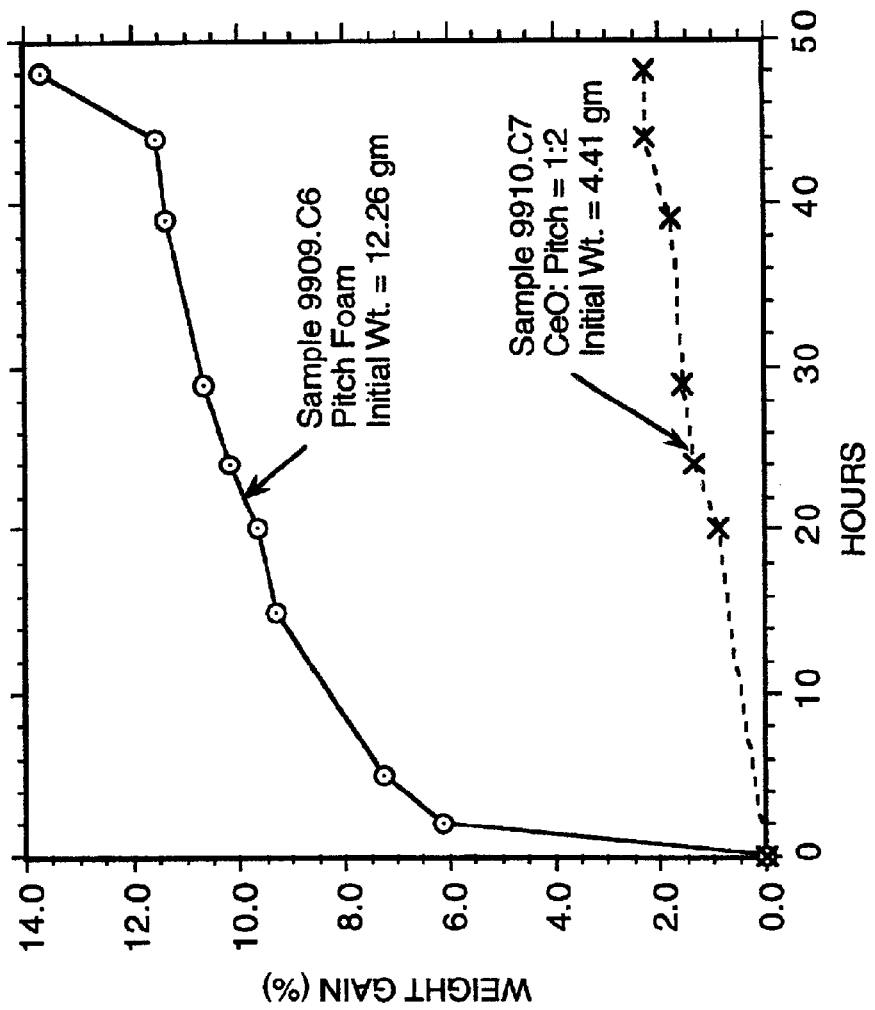
Figure 3. Percentage weight gain as a function of time during the oxygen stabilization process of microcellular carbon foams with and without cerium oxide catalyst.

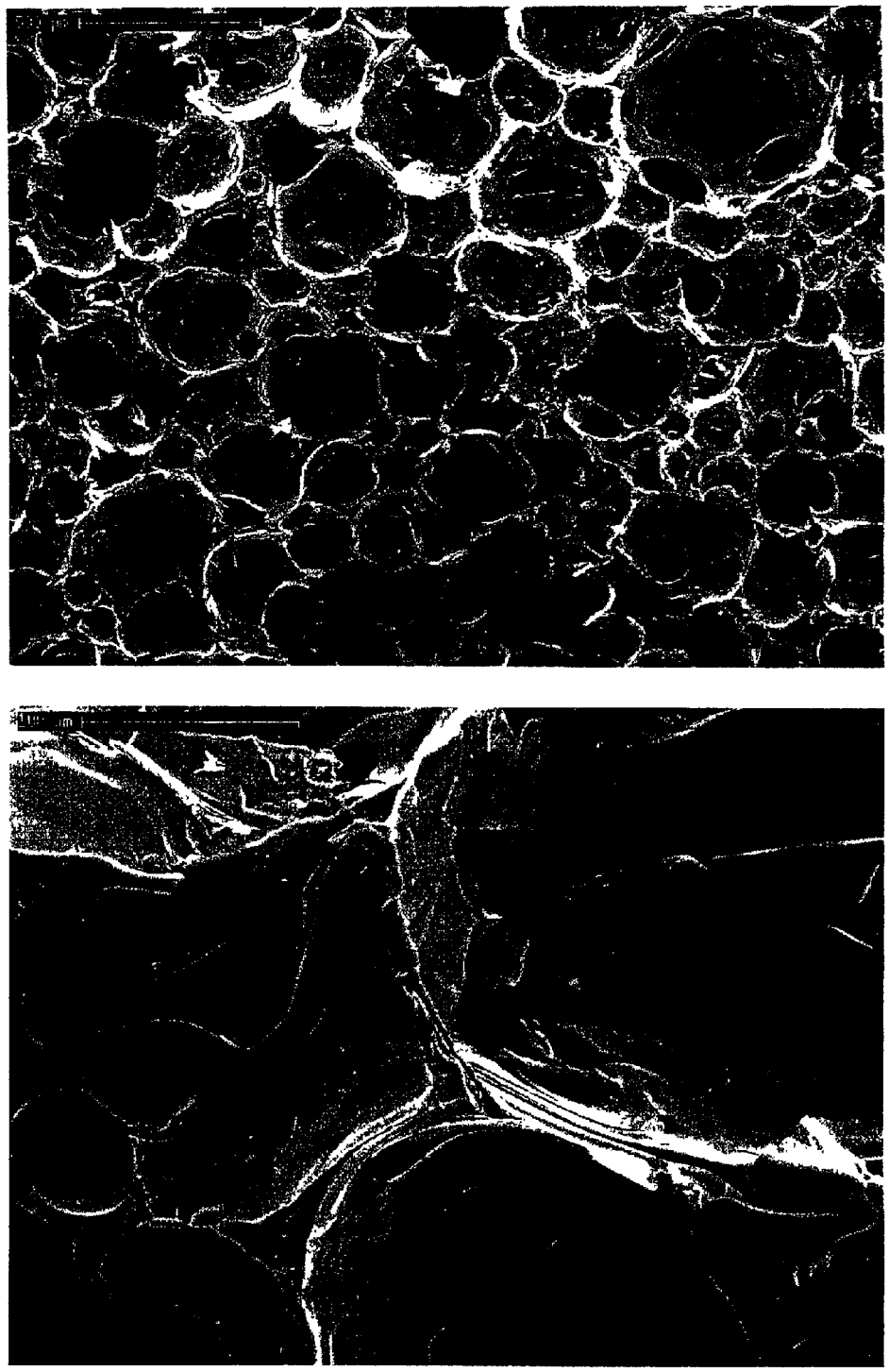
Figure 4. SEM photomicrographs of our low density carbon foams show uniform cell size.

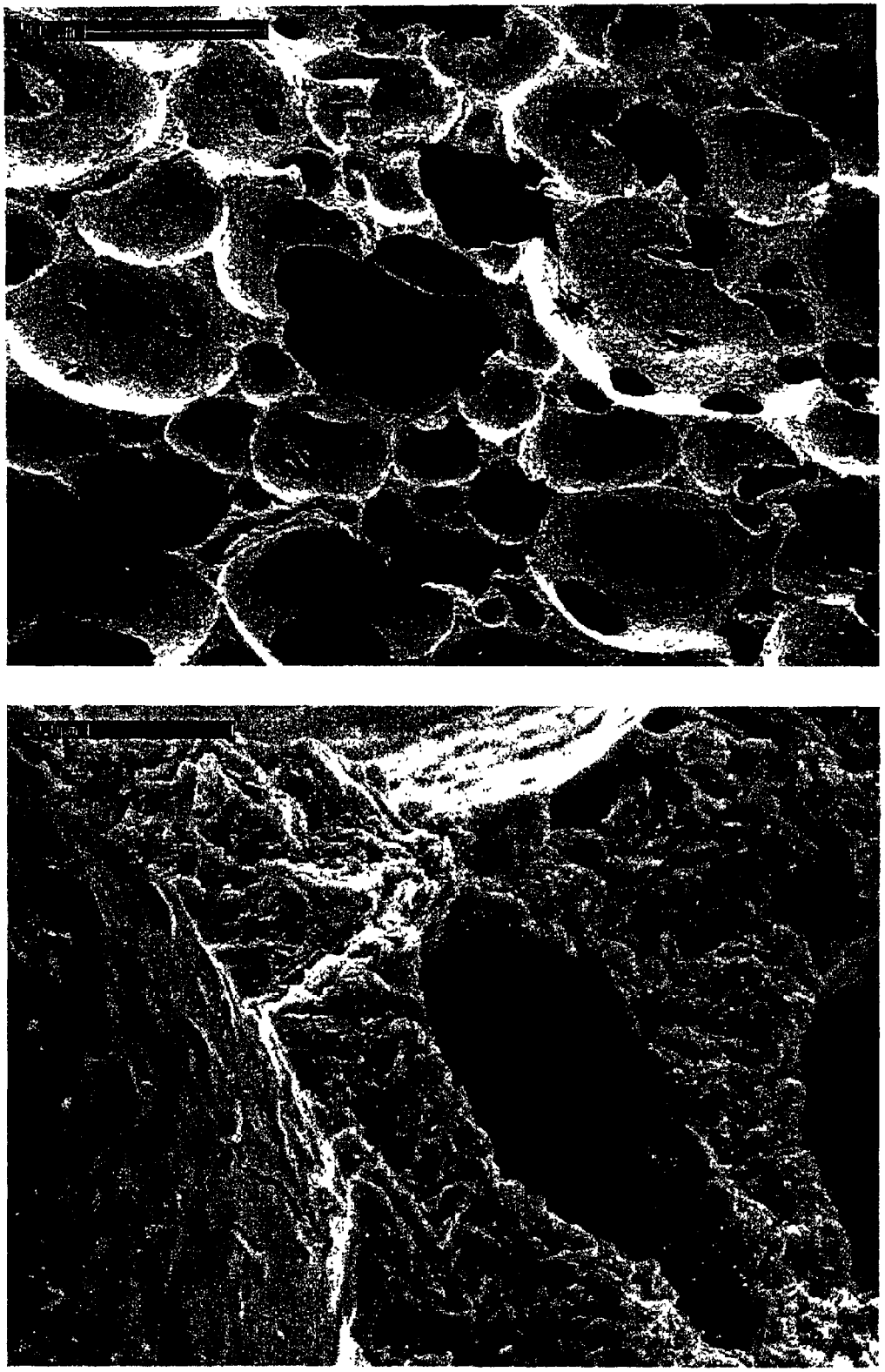
Figure 5. SEM fractograph of carbon foam with 10% nano iron oxide reveals an excellent orientation of heckle formation.

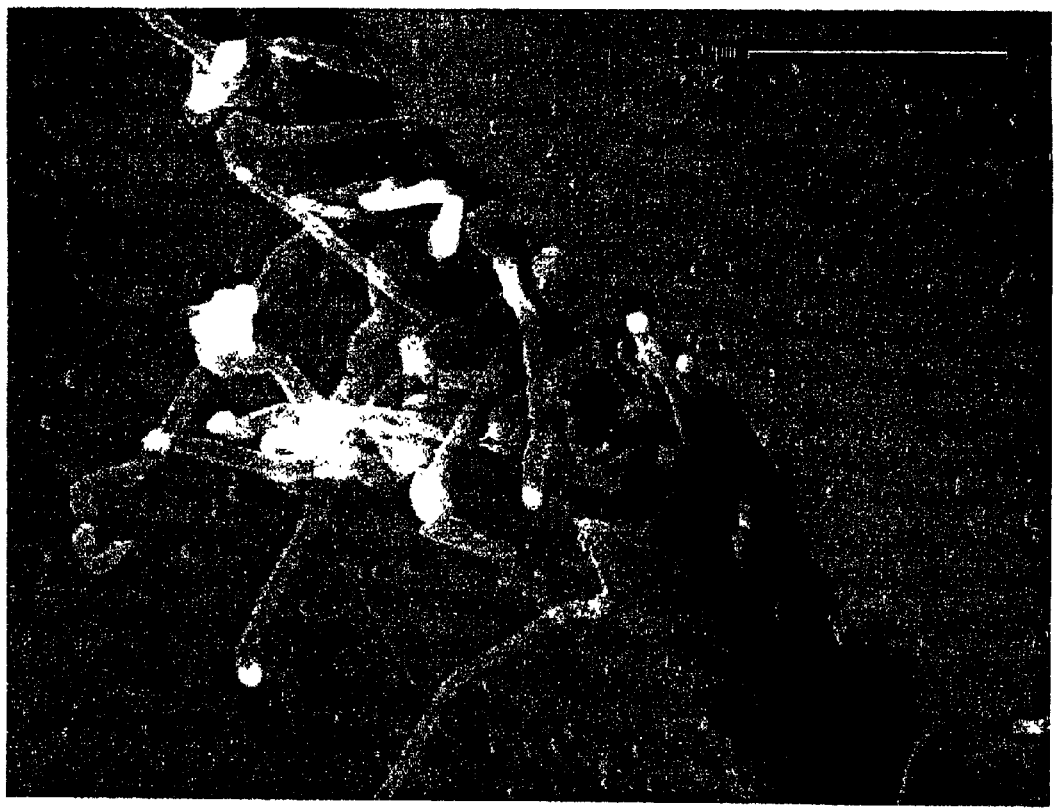
Figure 6. An exploded view of the foam sample with iron oxide nano powders reveals substantial amount of carbon nano fibers (CNF) grown from the iron oxide powders.

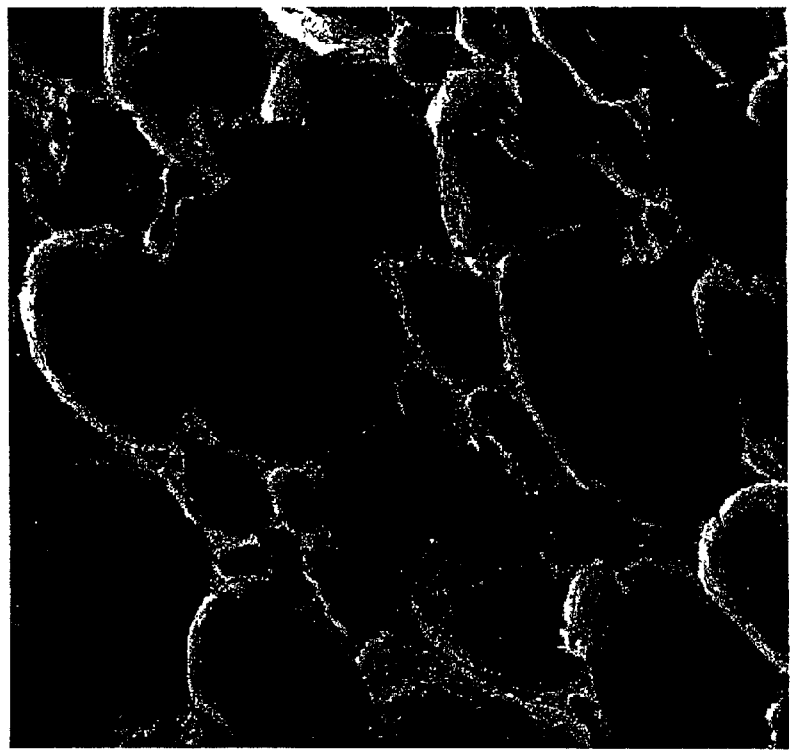
Scale bar = 600 microns.
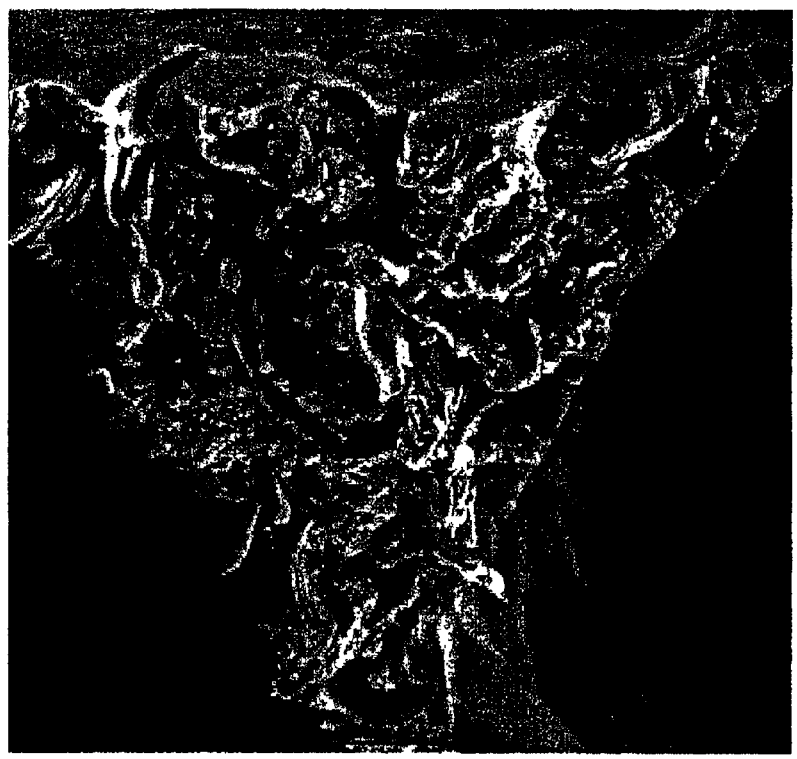
Figure 7. SEM fractograph of the fractured cell wall of a carbon foam with 33% of cerium oxide. Scale bar = 30 microns.

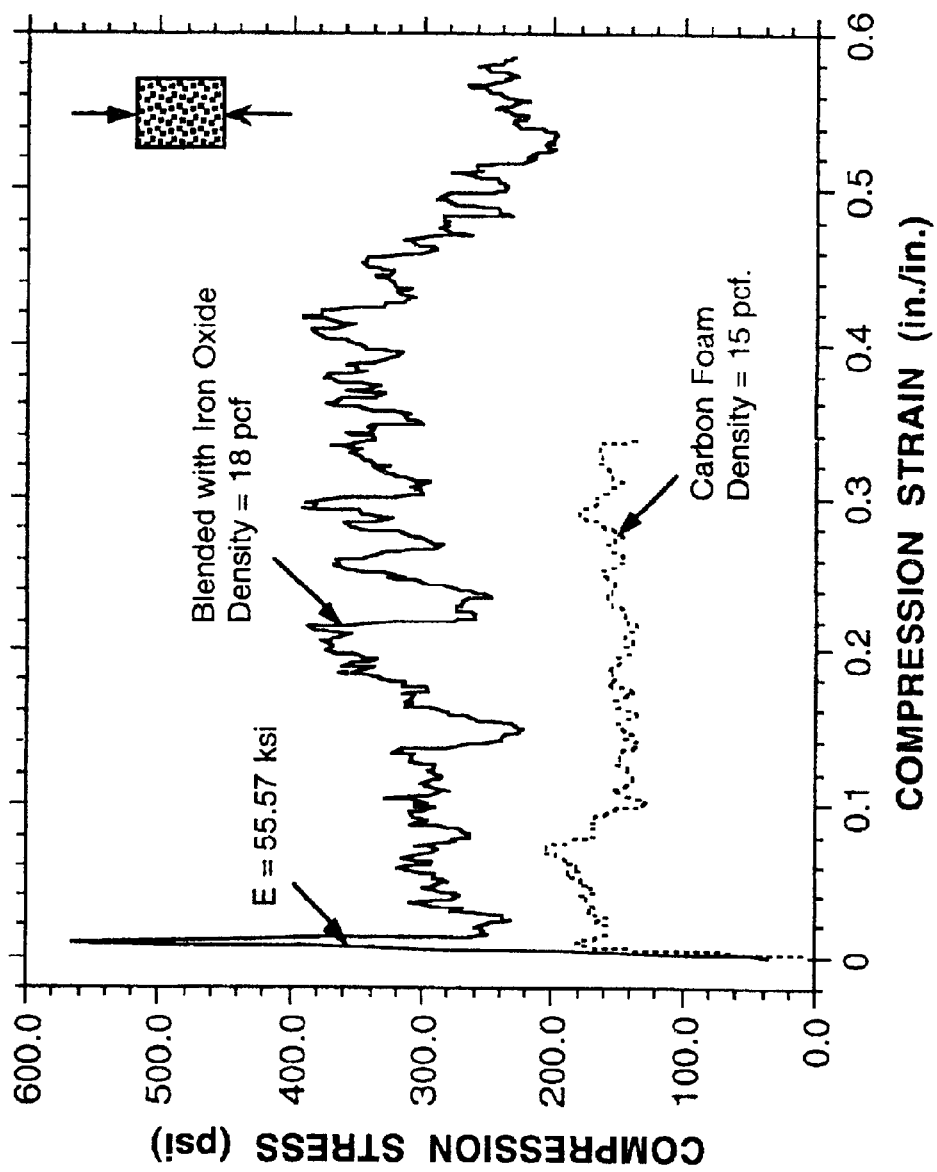
Figure 8. Compression stress-strain curves of graphitic foams with 5% of and without Iron oxide nano powders.

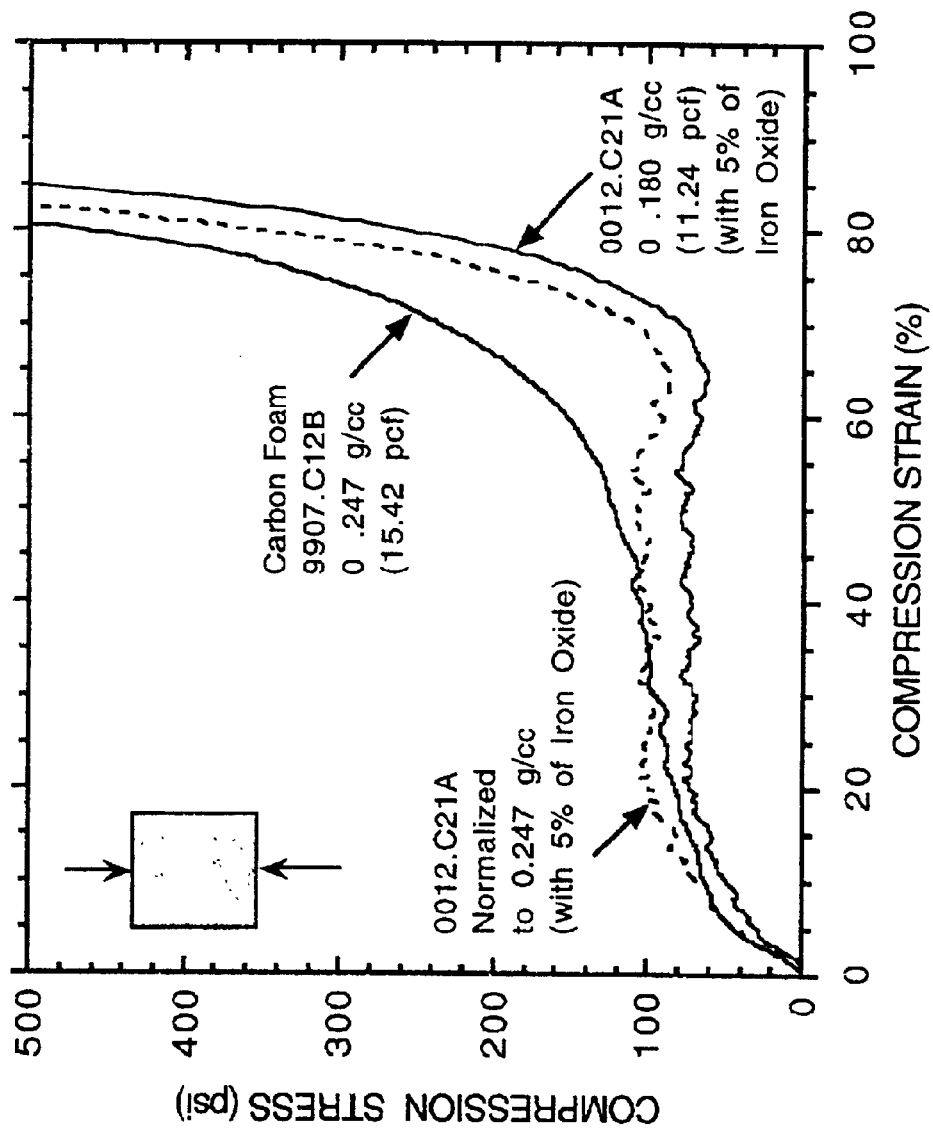
Figure 9. Compression stress-strain curves of carbon foams with 5% and without Iron oxide.

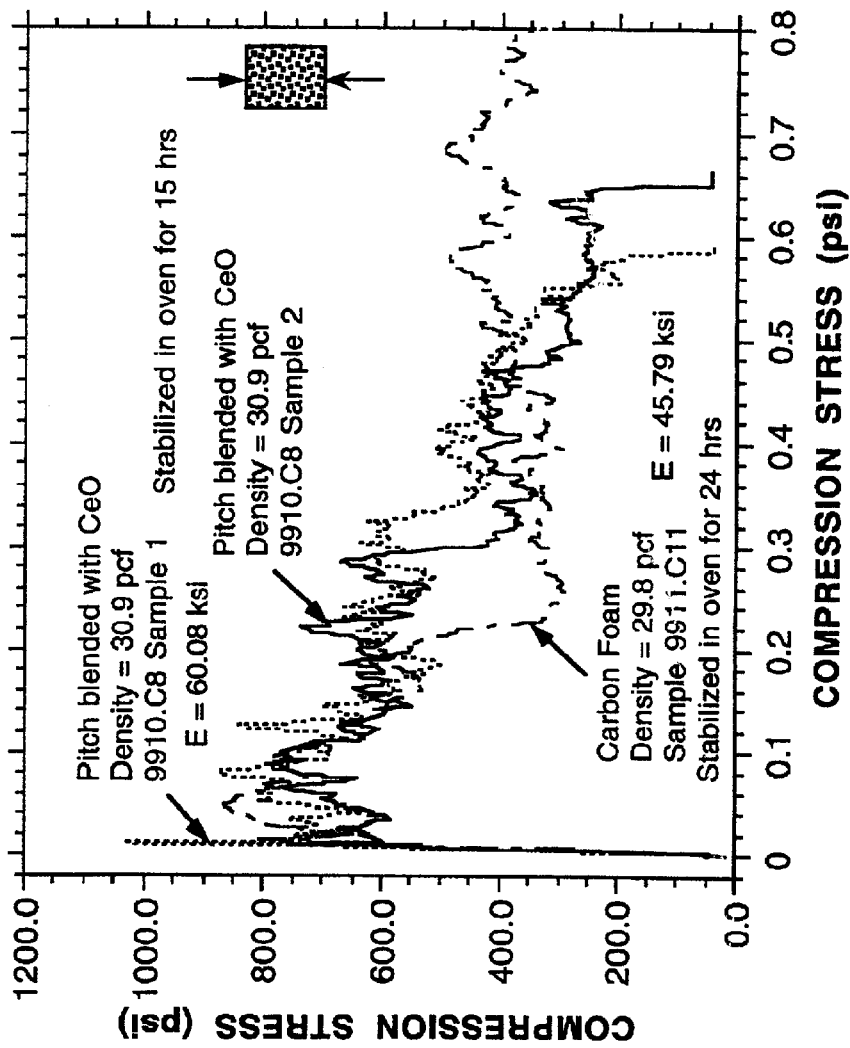
Figure 10. Compression stress-strain curves of carbon foams with 33% of and without Cerium oxide.

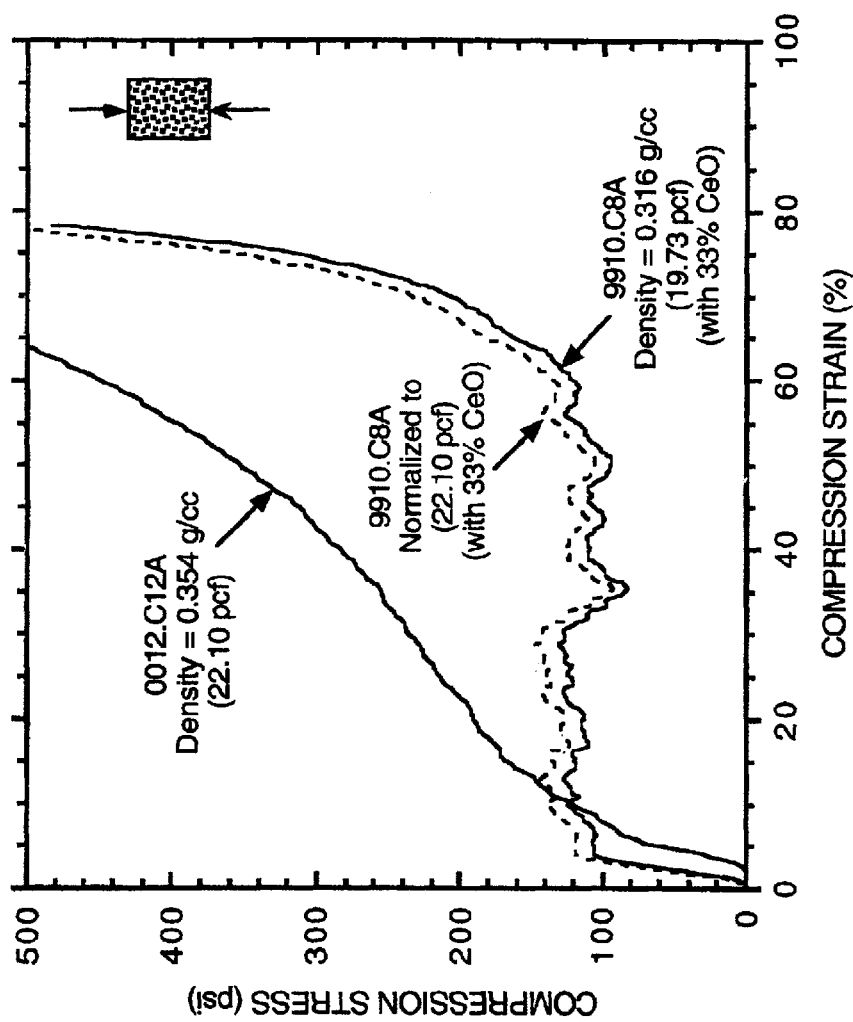
Figure 11. Compression stress-strain curves of graphitic foams with 33% of and without Cerium oxide.

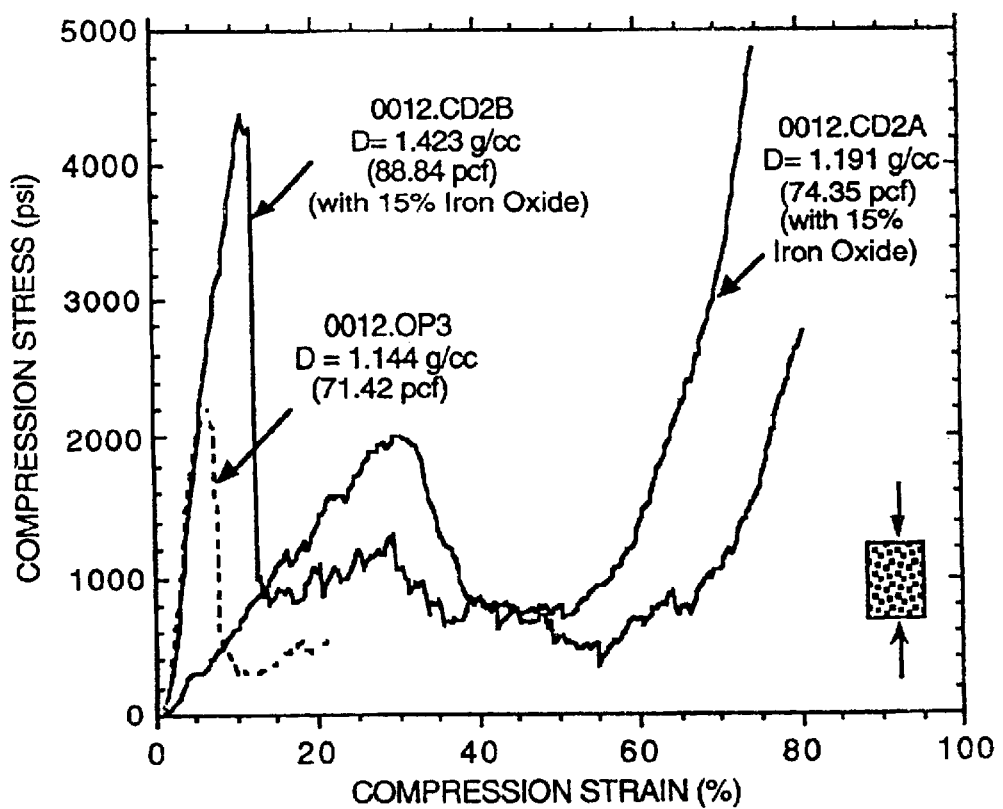
Figure 12. Compression stress-strain curves of solid graphitic panels with 15% of and without Iron oxide.

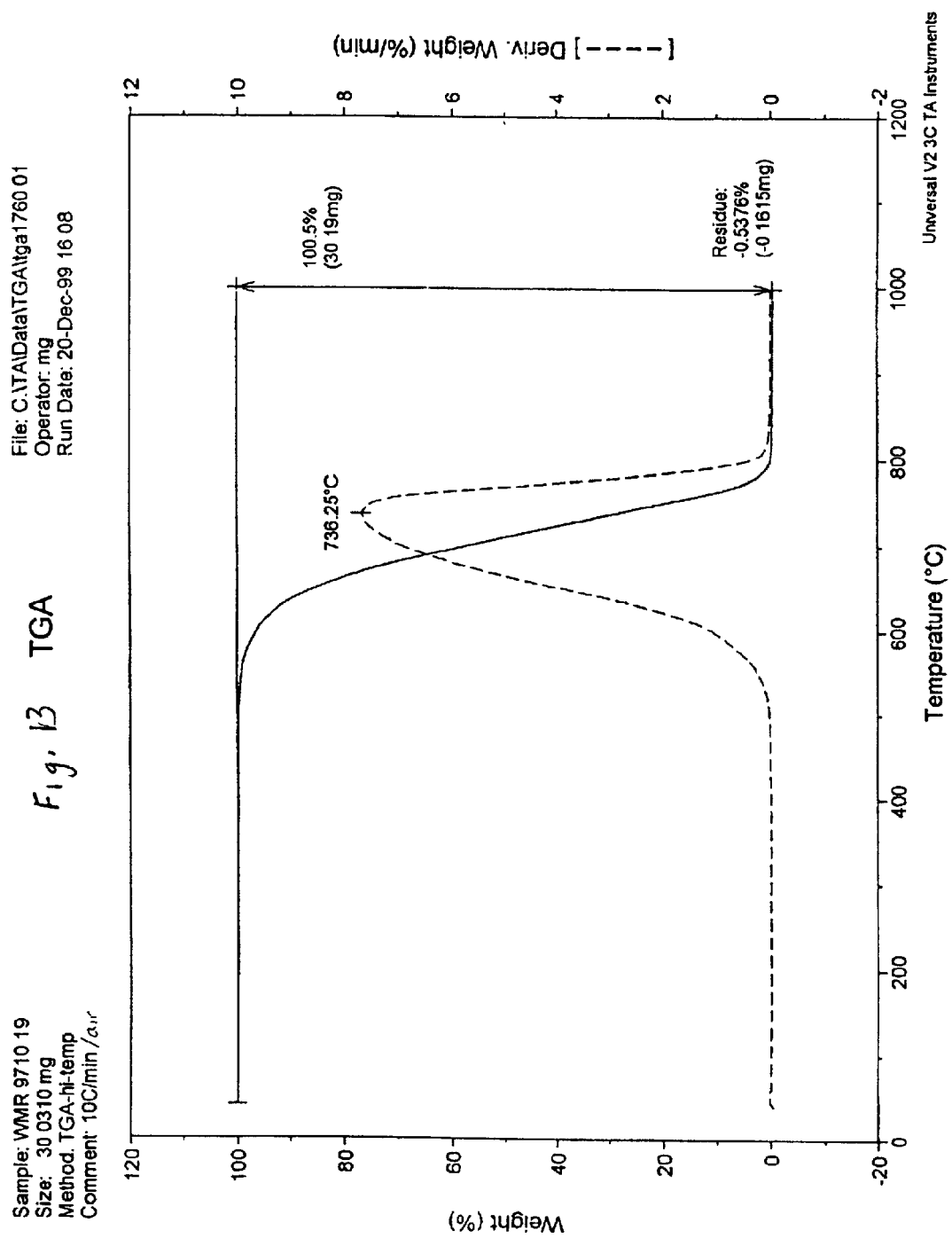
Fig. 13 TGA

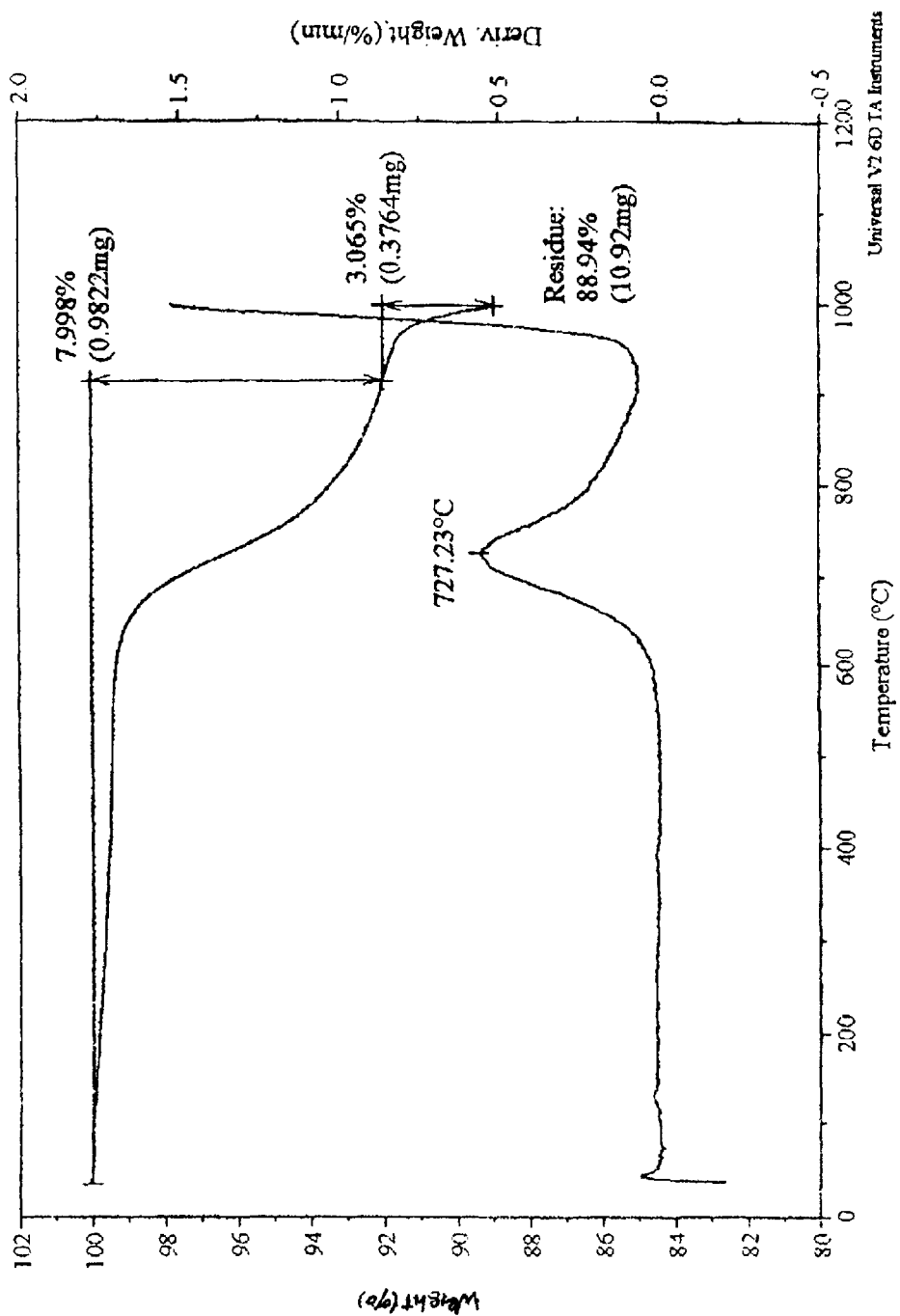
Fig. 14 TGA

RAPID OXIDATION/STABILIZATION TECHNIQUE FOR CARBON FOAMS, CARBON FIBERS AND C/C COMPOSITES

The United States of America may have certain rights in this invention under SBIR grant DE-FG02-00ER83125 from the Department of Energy.

FIELD OF THE INVENTION

The present invention relates to improved methods for the processing of carbon foams, carbon fibers, carbon ceramic composites and C/C composites and more particularly to methods for achieving oxidation/stabilization of such materials in significantly shorter periods of time than has been possible with prior art techniques and to carbon based products produced thereby.

BACKGROUND OF THE INVENTION

Current carbon materials are derived mainly from either petroleum or coal. Petroleum-derived pitch and graphitic carbon have demonstrated superior mechanical, electrical and thermal properties. Coal-derived carbon is more difficult to process and generally has less material uniformity and lower performance, i.e properties than those derived from petroleum. Most of the petroleum companies produce pitch, a carbon precursor, as a by-product of the refining process. Mitsubishi Chemical Co. is one of the major producers of high performance mesophase pitch. Commercial sources of coal-derived pitch include Athabasca (or Alberta) pitch, Pittsburgh pitch, etc. The chemistry and processing of carbon is well known and has been discussed in numerous textbooks and publications.

High performance carbon fibers are conventionally produced from polyacrylonitrile (PAN). After spinning, the post-processing steps convert the resin fibers into carbon. Rayon is another carbon precursor but the properties of carbon materials produced therefrom are generally considered inferior to those obtained from pitch, petroleum, or PAN.

Crystalline carbon has excellent structural and propulsion properties including mechanical and thermal properties, retention of excellent mechanical properties at elevated temperatures, light-weight, excellent dimensional stability over broad ranges of temperature, and zero-outgassing. Because of their exceptional performance to weight ratio, carbon and carbon-carbon composites can play a unique role in structural components that fly or move including aircraft, space vehicles, and surface vehicles. A major obstacle for widespread use of carbon and carbon-based composites is the cost. High cost is due largely to the long post processing steps required in the fabrication of these materials. Carbon-based materials require several processing and post-processing steps at very high temperatures and for long periods of time, generally expressed in terms of tens of hours to obtain the highly desirable properties referred to hereinabove.

It is the costs associated with these long processing times that contributes significantly to their very high cost. The post-processing steps are, however, the key factors that determine the desirable mechanical, thermal and electrical properties of the carbon materials.

Another major challenge is the post-processing of thick section carbon structures where oxidation/stabilization is dependent upon diffusion of oxygen to the interior portion of the structure. In such structures, it is very difficult to get enough oxygen to the interior of the structure during oxidation/stabilization to provide a homogeneous structure. This can result in unacceptable non-uniform material properties and defects in the final structure. It is, therefore, extremely important to develop rapid and effective post-processing techniques for carbon-based materials from both an economic and a performance point of view. It is also very important that the technique can be applied to both thin and thick section structures.

High performance carbon-based materials are available in either dense or low-density form. The process for making dense or porous carbon from pitch typically involves preparation of a mesophase (liquid crystalline) pitch from residues and converting it into fibers or foams. As the precursors are spun into fibers, the large molecules and crystallites become aligned with the fiber axis. The subsequent oxygen stabilization step forms cross-links. Carbonization is conducted at temperatures around 1000° C., and graphitization at between 2200 and 3000° C. Among these steps, the stabilization step is generally the rate-limiting step in the process as it can typically take 24 to over 48 hours. While many options exist for stabilization (e.g., reaction with $HNO_3$), the method practiced most broadly is thermal oxidation in circulating air or a mixture of air and nitrogen. The oxidative stabilization reaction is believed to be oxygen diffusion limited. Two stabilization mechanisms are posited as possible: adding oxygen to an organic molecules raise the boiling or melting point (e.g., phenol boils at 182° C. vs. 80° C. for benzene) or, alternatively, oxygen may promote cross-linking between molecules. PAN and rayon are processed in ways similar to pitch.

Examination of the fundamental steps involved in stabilization has revealed that the time consuming stabilization is apparently due to the slow delivery of oxygen from the bulk to the internal region of the pitch or carbon structure. To homogeneously stabilize foam, oxygen needs to diffuse into the whole carbon mass. For very short oxidation times or for large pieces of carbon precursor, oxygen does not reach the center of the material, and such stabilization tends to introduce a non-uniform microstructure during carbonization. Oxygen permeation through the skin (outer layer) thickness of such compositions is believed to vary as the square root of time, indicating a diffusion controlled process of stabilization. The outer part (nearest the outer surface of the carbon material) often appears to be over oxidized, while the core (at the center of the carbon material) is insufficiently stabilized/oxidized and allows porosity formation and higher mobility of the molecular structure during pyrolysis (carbonization/graphitization). A carbon material with such a profile of stabilization does not have the superior mechanical properties preferably sought in such materials.

SUMMARY OF THE INVENTION

The present invention provides an enhanced method for the post processing, i.e. oxidation or stabilization, of carbon materials including, but not limited to, carbon foams, carbon fibers, dense carbon-carbon composites, carbon/ceramic and carbon/metal composites, which method requires relatively very short and more effective such processing steps. The introduction of an "oxygen spill over catalyst" into the carbon precursor supplies required oxygen at the atomic level and permits oxidation/stabilization of carbon materials in a fraction of the time and with a fraction of the energy normally required to accomplish such carbon processing steps. The products of these improved processes are also described and characterized.

DESCRIPTION OF THE DRAWINGS

FIG. 1 is a schematic representation of one embodiment of the oxidative stabilization process of the present invention.

FIG. 2 is a schematic flow diagram showing the sequence for the processing of microcellular carbon foam blended with an oxygen spillover catalyst according to one embodiment of the process of the present invention.

FIG. 3 is a graph of percentage weight gain as a function of time during oxygen stabilization FIG. 4 is an SEM photomicrograph of low density carbon foam prepared according to the method of the present invention.

FIG. 5 is an SEM fractograph of carbon foam containing 10% by weight of nano iron oxide.

FIG. 6 is an exploded view of the foam sample of FIG. 5 showing a substantial amount of carbon nano fibers (CNF) grown from the iron oxide powders.

FIG. 7 is an SEM fractograph of the fractured cell wall of a carbon foam containing 33% by weight of cerium oxide.

FIG. 8 shows compression stress-strain curves for carbon foams containing 5% by weight iron oxide and without iron oxide.

FIG. 9 shows compression stress-strain curves for graphitic foams containing 5% by weight iron oxide and without iron oxide.

FIG. 10 shows compression stress-strain curves for carbon foams with and without 33% by weight of cerium oxide.

FIG. 11 shows compression stress-strain curves for graphitic foams with and without 33% by weight cerium oxide.

FIG. 12 shows compression stress-strain curves for solid graphitic panels with and without 15% by weight of iron oxide.

FIG. 13 shows the results of TGA-analysis of a carbon foam containing no. catalyst.

FIG. 14 shows the results of TGA analysis of a graphitic foam processed with 5% by weight of iron oxide catalyst.

DETAILED DESCRIPTION

In recent years, the processing of carbon foams has attracted significant attention in the carbon community. For example, U.S. patent application Ser. No. 09/222,630, filed Dec. 29, 1998 describes a novel process for the fabrication of enhanced carbon foams. In this application, we have used the microcellular carbon foam fabrication technique of that application enhanced by the rapid post-processing technique of the instant application is used to demonstrate that microcellular carbon foam materials post-processed in accordance with the instant invention exhibit superior performance relative to weight ratio and fracture toughness. The novel post processing techniques of the present invention have also been applied successfully in the post-processing of dense carbon materials.

The post-processing of carbon-based materials generally involves two to three steps: oxygen stabilization, carbonization, and graphitization (optional). These steps are typically conducted using ovens and furnaces in controlled environments. A typical oxygen stabilization process requires 24 to 48 hours or longer to complete depending upon the nature and structure of the carbon material being treated. This step is the longest among various post-processing steps. In this invention, we have developed a rapid processing technique for the oxygen stabilization of carbon precursors. Our novel approach is to deliver the oxygen to the pitch/PAN/rayon locally at the atomic scale. This is accomplished by the introduction of an "oxygen spillover catalyst", as defined herein, into the carbon precursor at a level of between about 1% and about 50% by weight of the carbon composition. Such introduction may be accomplished by incorporation of the oxygen spillover catalyst into the body of the carbon precursor by mixing or blending with the carbon starting material or by exposing the carbon precursor to the oxygen spillover catalyst during the stabilization or carbonization step. From a materials standpoint, oxides that uptake and release oxygen or exhibit self-decomposition or the combination of both of these capabilities are characterized herein as "oxygen spillover catalysts". Nonstoichiometric rare earth oxides in the lanthanide series (e.g., Ce, Pr, and Tb) possess these unique properties. From the viewpoint of scale of materials, oxides in nano-scale may facilitate the oxygen transfer process. In the nano-scale, transition metal oxides like iron oxide ($Fe_2O_3$) can also release and deliver oxygen efficiently to a carbon precursor during stabilization.

The process has been demonstrated to work effectively in the context of the microcellular foams described in copending U.S. patent application Ser. No. 09/222,630 filed Dec. 29, 1998 as well as in the processing of thick and solid carbon panels. Our results in this invention show that oxygen stabilization of microcellular carbon foams and solid carbon panels can be completed in time spans as short as 0 to 2 hours, depending on the percentage of the catalyst used.

Carbon materials and microcellular carbon foams processed by the proposed rapid post-processing technique have demonstrated the following advantages as compared to those processed by conventional techniques:

(1) higher modulus and yield strength (graphitized foams processed by the proposed technique appear to be very ductile);

(2) both the carbon foams and solid structures have better mechanical properties;

(3) the oxygen stabilization step can be completed within 0–4 hours in most cases, or about one order of magnitude less than by the conventional technique;

(4) thick solid structures may be processed in one step (carbonization) as compared to multiple steps (stabilization followed by carbonization) to avoid the blotting often experienced in prior art stabilization techniques; and (5) both the carbon foams and solid carbon materials demonstrate higher specific strengths when fabricated in accordance with the method described herein.

It is obvious that short processing times save energy consumption and therefore can significantly impact material cost. In addition, the processing technique described here can be used with any conventional oven. The rapid stabilization technique can be applied in two ways: (1) blending an oxygen spillover catalyst with the precursor of the carbon material; and (2) exposing the carbon material to the oxygen spillover catalyst during the stabilization step or carbonization step if the stabilization step can be and is omitted as described hereinafter.

Engineering carbon is normally prepared from carbon precursors like pitch and PAN into the desired shapes or morphology. Crystallites are aligned in specific manner in the processing stage. Subsequent oxygen stabilization forms cross-links so that they will not melt (blot) during the carbonization stage. Conventional oxygen stabilization is performed in a circulating oven for a long period of time, i.e. generally for from 24 to over 48 hours. Stabilization of thick carbon materials often requires several stabilization and carbonization cycles. Such repetitive stabilization is energy intensive and involves a long processing time. Since stabilization occurs by the diffusion of oxygen from the exterior surfaces of the sample, the interior portion of a thick panel may never be stabilized, even with repeated processing.

The chemical bonds created when the oxygen reacts with pitch or PAN tend to increase the melting point of the pitch/PAN until the pitch/PAN has been rendered infusible. Increased penetration of oxygen into the interior of the pitch/PAN article promotes more stabilization, and this can be accomplished with our novel approach. Our novel approach is to deliver the oxygen to the pitch locally at the atomic scale, thus minimizing oxygen diffusion control and enhancing oxygen penetration to all areas of the carbon volume) see FIG. 1 and description below).

The first of these approaches, that involving combination of the oxygen spillover catalyst with the carbon based starting material preferably uses: (i) any oxide(s) that may uptake and release oxygen, (ii) any oxide(s) that exhibit self-decomposition, or (iii) the combination of i and ii. Nonstoichiometric rare earth oxides in the lanthanide series possess these unique properties. These include, e.g., cerium (Ce), praseodymium (Pr), and terbium (Tb) oxides.

The second approach, that involving exposure of a carbon precursor to the oxygen spillover catalyst, uses the introduction of nano scale oxides, i.e. oxides in nano-scale that facilitate the oxygen transfer process. In the nano-scale approach, transition metal oxides like $Fe_2O_3$ that can release and deliver oxygen efficiently to pitch/PAN during stabilization are used. Oxygen spillover is of interest because of its involvement in a number of catalytic related processes. Notable examples are (i) oxidation reactions, (ii) removal of the surface carbon from catalysts by spillover oxygen, and (iii) removal of the surface oxygen from metal catalyst. Of course, it is obvious and will be demonstrated by the examples below, that transition metal oxides can also be blended with the carbon based starting material to obtain the advantages of the herein described process.

Processing of Microcellular Foams

As applied to these materials, the process of the instant invention involves blending the pitch/PAN with an oxygen spillover catalyst using a blender or grinder. The blended raw materials are vacuumed dried (optional) and compression molded into appropriate shapes in a die, e.g., rectangular, circular or other shapes. The thickness of the samples can be varied by using different amounts of raw materials. The compression-molded samples are then foamed in a pressure vessel according to the process shown in FIG. 2. The blended pitch/PAN is softened in the pressure vessel by raising the temperature to over 270° C. This process is carried out under a steady stream of inert gas, and efforts are made to ensure uniform heating of the pitch/PAN/rayon disk. The disk is then saturated with an inert gas at high pressure. The saturating gas is preferably an inert gas such as nitrogen, carbon dioxide, helium, argon, etc. These gases have different solubilities in pitch/PAN and the choice of the appropriate gas will be determined as best described in the aforementioned U.S. patent application Ser. No. 09/222,630 by the porosity of the foam desired. The pressure and temperature are dropped suddenly to lock in the desired bubble size and to obtain the foamed pitch/PAN/rayon sample. An inert gas may be injected into the pressure vessel for quenching of the samples after high pressure is released. This pressure may range from 10 to 100 psi. After the foam cools down to about 240° C. (or below 270° C.) compressed air with the same range of pressure may be used for cooling as it contains oxygen that permits in-situ stabilization before the foam reacts or coats with any gas/chemical species in the environment. The green carbon foam is then be oxygen stabilized, carbonized, and graphitized.

Processing of Solid Carbon, Carbon/Carbon, Carbon/Ceramic Composites

Dense materials and structures from carbon, carbon/carbon, carbon/ceramic, and carbon/metal composites can be processed in various thicknesses in one step using the technique in this invention. The molded shape with the oxygen spillover catalyst can be prepared in two ways. The first way is to blend a pitch/PAN/Rayon powder with an oxygen spillover catalyst using a blender or grinder. The blend is then fabricated into any desired shapes by compression molding, extrusion, injection molding, or resin transfer molding techniques. The second preparation technique is to blend a pitch/PAN/Rayon powder with an oxygen spillover catalyst and then stabilize the blended powders in a circulating oven. The blended powders are then molded into the desired shapes using compression molding, extrusion, injection molding, or resin transfer molding techniques. In the case of composites where carbon or ceramic fabrics are used, the fabrics can be placed inside a mold and the resin (blended with an oxygen spillover catalyst) injected into the mold to make the shape desired.

After a consolidated shape is made using any of the techniques mentioned above, it is then preferably stabilized in a circulating oven. The length of the stabilization time depends on the amount of oxygen spillover catalyst used for the consolidated shape as shown in the examples below. We have also shown that the stabilization step can be omitted when sufficient oxygen spillover catalyst is applied. Examples are also provided below. For a structure with a thick cross-section, since the oxygen stabilization process occurs everywhere in the material simultaneously, a thick, dense carbon composite can be fabricated in one step. It will be extremely difficult, if not impossible, to fabricate a thick carbon composite by the conventional technique in a one step process, as the interior of the part will take a very long time to be stabilized. Additionally, since the diffusion process occurs from the exterior to the interior non-uniform properties may result (different depths have different degrees of oxygen stabilization). Thick carbon composites fabricated by the method of the present invention exhibit substantially uniform material properties because the stabilization process occurs everywhere simultaneously in the carbon structure (at the atomic level).

Processing of Carbon Fibers

Carbon fibers can be processed by two versions of this novel technique. First, the pitch/PAN/rayon resin can blended with an oxygen spillover catalyst such as iron oxide or cerium oxide powder and the carbon precursor processed into fibers using an extruder and the fibers melt spun through a water bath or air. Alternatively, the pitch/PAN/rayon can be melted and homogeneously blended with the oxygen spillover catalyst in a barrel and then extruded through a die. The extrudate can be drawn down by a take-up to form a fiber or simply extruded out as a rod.

The second method of using this invention for rapid stabilization of carbon fibers actually omits the conventional stabilization step. The technique to do this is to spread some oxygen spillover catalyst on and around the fibers, i.e expose the fibers to the oxygen spillover catalyst, during the carbonization step. Although the carbonization step is conducted in an environment with an inert gas, the oxygen spillover catalyst will give off oxygen during the heat up process. The amount of oxygen made available in this fashion is enough to stabilize the carbon fibers. Since the heat up rate is generally slow, the oxygen spillover catalyst will give off all the absorbed oxygen during the heating process (typically at or near 200° C.) and any excess will be expelled from the furnace, if a constant, small flow of inert gas is used during the carbonization step, and the furnace is appropriately vented.

Carbonization after stabilization is generally performed in a tube or box furnace with a nitrogen or helium atmosphere. The carbon material is heated slowly (at 1° C./min to 5° C./min) up to 600~1000° C. and held for about one hour. The samples are then cooled down slowly to room temperature.

Graphitization can be performed in a graphite vacuum furnace according to conventional techniques. Such a process generally involves heating to from about 2000° C. to about 3000° C. in a vacuum environment. These steps are similar to heat treatment of conventional carbon materials.

EXAMPLES

The following examples will serve to better illustrate the successful practice of the present invention.

Example 1

To establish baseline data we first determined the time needed for the oxygen stabilization of a foam processed by from carbon precursor (such a foam is defined as green foam) without any oxygen spillover catalyst by measuring its weight gain during the oxygen stabilization process. Mesophase pitch, was purchased from Mitsubishi Gas Chemical Co. It is marketed under the trade name ARA24ZPP. During the oxygen stabilization process, a green carbon foam is normally heated at a rate of 1–2° C./min to 230–240° C. and soaked for a period of time (generally over 24 hours). The weight gain of the green carbon foam was measured after it reached 230° C. at various soaking times. The results are plotted in FIG. 3. It appears that the weight gain is very fast during the initial 2 hours (6.13%). The rate of the weight gain slows down with time. After 24 and 48 hours, the sample gained 10.2% and 12.8% of weight, respectively. On the other hand, a microcellular foam processed from mesophase pitch that contains 33% by weight of cerium oxide only gains about 2% of weight after stabilization for 48 hours in an air circulating oven. The percentage of the weight gain changes-very little as a function of time. Similar studies have also been performed using nano powders of iron oxide varying the weight percentage of iron oxide in the pitch foam between about 5% and about 20% by weight. Note that either cerium oxide or iron oxide catalyst was blended with pitch powders as the first step of the, foaming process. The weight gain percentages of mesophase pitch foams containing 5 or 10% by weight of iron oxide show that they both increased by only 2% after stabilization for 48 hours in an air circulating oven. The weight gain shows very little change over time. The weight gain of the mesophase pitch foam with 20% of iron oxide decreased by 3% right after it reached 230° C. and remained flat during the entire stabilization process. The weight reduction could be due to the burn off of some of the catalyst. The curve indicates that the foam is fully stabilized between 0 to 2 hours.

Example 2

Disks were compression molded from mesophase pitch ARA24ZPP containing cerium oxide and foamed according to the foaming procedure described above and in the referenced U.S. patent application Ser. No. 09/222,630. The disks were soaked with carbon dioxide gas at 3700 psi and at 322° C. for about 40 minutes. After releasing the gas abruptly, nitrogen gas was injected into the vessel to quench the samples initially, and then switched to compressed air when the temperature inside the vessel dropped to about 233° C. Using the same foaming procedures and conditions except that the high pressure soaking time was only 15 minutes also resulted in excellent foams. After carbonizing the green foams at 1000° C. for one hour, we obtained carbon foams with a density of 0.191 g/cc (11.9 pcf, pound per cubic feet). Scanning Electron Microscopy (SEM) analyses were performed to examine the morphologies of the carbon foams without a catalyst. A typical low-density carbon foam, FIG. 4, shows that the cell sizes are quite uniform.

Example 3

In this example carbon foams were processed with the addition of nano iron oxide powders in various percentages by weight. Nano-iron oxide was selected by virtue of its unique features: 3 nanometer size, 250 $m^2/g$ surface area, amorphous structure, high purity, superior catalytic activity, and unique ultraviolet absorption and screening.

Mesophase pitch ARA24ZPP powders were blended with 5~20% by weight of iron oxide nano-powder and compression molded into disks using a hydraulic press. The disks were then foamed using the foaming procedure described above. The disks were soaked with carbon dioxide gas at 1800 psi and at 325° C. for about 20 minutes. After releasing the gas abruptly, nitrogen gas was injected into the vessel to quench the samples initially, and then switched to compressed air when the temperature inside the vessel dropped to about 240° C. After carbonizing the green foams at 1000° C. for one hour, we obtained carbon foams containing 10% by weight of iron oxide with a density of 0.307 g/cc (19.17 pcf). Scanning Electron Microscopy (SEM) analyses were performed to examine the morphologies of the carbon foams with various percentages of nano iron oxide catalyst. A typical carbon foam containing 10% by weight of iron oxide is shown in FIG. 5. The nano-size particles appear to be distributed very uniformly in the foam. The fracture surface is composed of ordered heckle structure whereas pure carbon foam, although heckle and tortuous, does not have this degree of orientation. The addition of 5% by weight of iron oxide creates a microscopic morphology resembling that containing 10% by weight of iron oxide.

A higher magnification of the carbon foam sample shown in FIG. 5 reveals substantial amount of carbon nano fibers (CNF) grown from the iron oxide powders (see FIG. 6). It appears that the iron oxide powders remain on the top of the CNF during the growing process. The length of the scale bar is 1.00-micron meter. The diameter of the CNF is about 2 times of the diameter of the nano iron oxide powder.

Example 4

In this example, mesophase pitch was blended with 33% by weight of cerium oxide powder. The foaming procedure described above has been used under the specified conditions. Carbon dioxide gas was used to saturate the sample at 335° C. and at 3550 psi. The high pressure was maintained for 11 minutes and vented rapidly. FIG. 7 shows SEM photomicrographs of a typical carbon foam containing 33% by weight cerium oxide resulting from this procedure. Its fracture surface has the same amount of heckle formation as those with iron oxide but has less degree of orientation. All the carbon foams processed according to the technique of this invention have extremely,high fracture toughness as demonstrated by their stress-strain relationships as shown in subsequent Examples.

Example 5

Mesophase pitch was blended with 20% by weight of iron oxide nano powder. Carbon dioxide gas was used to saturate the sample at 322° C. and at 3700 psi. The sample was soaked at this high pressure for 15 minutes and vented rapidly. After releasing the gas abruptly, nitrogen gas was injected into the vessel to quench the samples initially, and then switched to compressed air when the temperature inside the vessel dropped to about 224° C. The sample was then carbonized at 1000° C. for 1 hour. Although the stabilization step (required for conventional carbon materials) was eliminated, the carbon sample did not blot, i.e. melt during carbonization.

Example 6

Numerous carbon foams were prepared with varying amounts of oxygen spillover catalyst and at various conditions. The results indicate that the stabilization time needed to prevent any blotting (melting) during carbonization are summarized in below.

- Stabilization time=0~2 hrs with 20% by weight of iron oxide
- Stabilization time=2~4 hrs with 10% by weight of iron oxide
- Stabilization time=>4 hrs with 10% by weight of iron oxide
- Stabilization time=>4 hrs with 5% of by weight iron oxide

Example 7

To demonstrate the applicability of the technique to solid carbon and carbon composites mesophase pitch was blended with 20% by weight of iron oxide nano powder and compression molded it into disks at room temperature. The disks were carbonized at 1000° C. for 1 hour. The disks did not blot and became very strong. Some samples were stabilized for varying lengths of time to determine if these variations affected results. The relation of sample thickness and the stabilization times is summarized in below.

- Sample thickness=1/16-in stabilization time=0 hrs with 20% by weight of iron oxide
- Sample thickness=1/8-in stabilization time=2 hrs with 20% by weight of iron oxide
- Sample thickness=1/4-in stabilization time<24 hrs with 20% by weight of iron oxide
- Sample thickness=1/8-in stabilization time=4 hrs with 15% by weight of iron oxide
- Sample thickness=1/8-in stabilization time=4~8 hrs with 10% by weight of iron oxide For thin solid panels (less than 1/16-in.), the results indicate that the normal stabilization step using an air-circulating oven can be omitted if 20% by weight of iron oxide catalyst is used. This is apparently due to the fact the stabilization can be completed rapidly during the heat up process of the carbonization step. The oxygen spillover catalyst serves as the source of stabilizing oxygen. For this reason, it was anticipated that the stabilization step may also he omitted for thicker panels.

As a comparison mesophase pitch was compression molded without an oxygen spillover catalyst into disks 1/8 inch thick. After stabilization for 48 hours in a circulating oven, the samples were carbonized at 1000° C. for 1 hour. The results show that there is extensive blotting (melting) in the samples. Therefore, we conclude that a thick carbon sample cannot be processed in one step by conventional techniques.

Example 8

A green carbon foam was processed from mesophase pitch ARA24ZPP with nitrogen as the saturating gas at 300° C. The foaming procedures mentioned above were used. This results in an intermediate density foam. The pitch foam thus obtained was then placed in a ceramic tray made of silicon oxide. A very thin layer of iron oxide nano powder was then sprayed on and around the foam sample. The tray and the sample were placed inside of a tube furnace for carbonization. Note that the sample was not stabilized by any conventional techniques. The processing tube was purged and filled with nitrogen gas. The sample was carbonized at 800° C. for one hour. The resulting carbon foam did not blot and appeared to he strong. This is because oxygen was released from iron oxide nano powder and stabilized the pitch foam at some point during the heating step. Carbon fibers can be carbonized this same way thereby eliminating the need for the conventional stabilization step.

Example 9

The mechanical properties of the carbon and graphitic foams were tested under compression loading. The typical compression stress-strain relationship of a carbon foam, FIG. 8, shows that the fracture strain is about 34%. With the addition of 5% by weight of iron oxide, the failure initiation strength is increased by 3 times and the fracture strain increases to 58%. The stress-strain curve is as tortuous as what microscopic morphology would indicate from the structure shown in FIG. 5. The improvement in fracture strength and strain of the carbon foam blended with iron oxide nano powder is apparently due to the fact that carbon nano fibers grew in the carbon foam, FIG. 6, thus serving as a reinforcement.

We have graphitized the carbon foams at 2600° C. in a vacuum environment for one hour. The compression stress-strain curve of a pure carbon foam (without any catalyst), FIG. 9, appears to be ductile, similar to metal foam. Ultimate fracture does not occur on samples loaded to 80%. The carbon foam containing 5% by weight of iron oxide also does not show a fracture point. After the density is normalized to 0.247 g/cc (same as the pure carbon foam), the initial modulus and yield strength appear to be higher than those of the pure carbon foam. They cross over the curve of the pure carbon foam at about 35% strain and then the modulus and loading capability increase dramatically.

Example 10

The results of the compression testing of carbon foams containing 33% cerium oxide powder prepared as described above, are compared to pure carbon foam in FIG. 10. The density of all foam samples is about 30 pounds per cubic foot (pcf). All testing specimens were machined into near cubical shape. The comparison indicates that carbon foams containing the cerium oxide catalyst exhibit significantly increased modulus and failure initiation strength. Graphitic foams with 33% by weight of cerium oxide are compared to that of a pure carbon foam in FIG. 11. The comparison is consistent with the comparison of the carbon foams with and without iron oxide nano powders, see FIG. 9. Carbon foams with cerium oxide have higher initial modulus and yield strength than pure carbon foams. The stress-strain curves then cross each other at a higher strain level, and the moduli increase drastically later. No global fracture was detected for the graphitic foams that were processed.

Example 11

Compression testing has also been performed on solid carbon panels processed with and without an oxygen spillover catalyst. Since most of the samples processed from pure mesophase pitch resulted in blotting, only a few good specimens were obtained from the edges of the test panels. Testing specimens were machined into near cubical shape. The results, FIG. 12, show that graphitic panels with 15% by weight of iron oxide have twice the compression strength as compared to the pure graphitic panel samples.

Example 12

Experiments were performed to examine if any oxides remaining in the carbon materials after the post processing steps expedite the oxidation of the carbon materials during applications at elevated temperatures. TGA (thermogravimetric analysis) was performed to measure the weight loss of the carbon foams and solid carbons in air to 1000° C. The heating rate of this analysis was 10° C./min. FIG. 13 shows the results for a pure carbon foam that shows that oxidation starts to occur at about 500° C. and the foam can be totally oxidized (become $CO_2$ gas) at 800° C. depending on the thickness of the sample used. The oxidation behavior of a graphitic foam processed with 5% by weight of iron oxide, FIG. 14, reveals that oxidation starts at about the same temperature. However, it oxidizes at a very slow rate. Unlike pure carbon foam, this sample only lost 11.06% of mass after it reaches 1000° C. Another graphitic solid sample processed with 15% by weight of iron oxide also shows a similar behavior. The oxidation process occurs slowly after it reaches 500° C. When it reaches 1000° C. it loses 33% of mass. This dramatic increase in oxidation resistance behavior in both porous foams and solid samples is apparently due to the inclusion of the oxide catalyst in these carbon materials.

X-ray analyses of carbon and graphitic foams processed with oxygen spillover catalysts reveal that these carbon foams contain carbon or graphite, oxides (catalyst), and small amounts of carbides. Carbides formed due to the reaction of the oxide and carbon whereas metals: are the result of oxidation of the oxide, e.g. iron oxide becomes iron. The catalysts(oxides) appear to be very stable even when the graphitization step is performed at 2600° C.

As the invention has been described, it will be apparent to those skilled in the art that the same may be varied in many ways without departing from the spirit and scope of the invention. Any and all such modifications are intended to be included within the scope of the appended claims.

What is claimed is:

1. A method for the fabrication of a carbon foam, carbon fiber, carbon ceramic composite or C/C composite fabricated from a petroleum or coal pitch, polyacrylonitrile or rayon by a process comprising:
   A) forming a carbon precursor;
   B) providing to said carbon precursor a lanthanum series oxide oxygen spillover catalyst; and
   C) forming said carbon foam, carbon fiber, carbon ceramic composite or C/C composite.

2. The method of claim 1 wherein said oxygen spillover catalyst is provided to said carbon precursor by blending of said lanthanum series oxide oxygen spillover catalyst with said petroleum or coal pitch, polyacrylonitrile or rayon starting material prior to formation of said carbon precursor.

3. The method of claim 1 including the further steps of stabilizing and carbonizing said carbon precursor and wherein said lanthanum series oxide oxygen spillover catalyst is provided to said carbon precursor by exposure of said carbon precursor to said lanthanum series oxide oxygen spillover catalyst during stabilization or carbonization.

4. The method of claim 2 wherein said lanthanum series oxide oxygen spillover catalyst is blended with said petroleum or coal pitch, polyacrylonitrile or rayon starting material at a concentration of from about 1 to about 50 percent by weight of said petroleum or coal pitch, polyacrylonitrile or rayon starting material.

5. The method of claim 4 wherein said lanthanum series oxygen spillover catalyst is blended with said petroleum or coal pitch, polyacrylonitrile or rayon starting material at a concentration of from about 5 to about 30 percent by weight of said petroleum or coal pitch, polyacrylonitrile or rayon starting material.

6. The method of claim 3 wherein said exposure of said carbon precursor to said lanthanum series oxygen spillover catalyst during stabilization or carbonization is accomplished by spraying said carbon precursor with said lanthanum series oxygen spillover catalyst prior to stabilization or carbonization.

* * * * *